(12) United States Patent
Sunadham et al.

(10) Patent No.: US 10,206,015 B2
(45) Date of Patent: Feb. 12, 2019

(54) SYSTEM AND METHOD FOR VEHICLE DATA COMMUNICATION

(71) Applicant: Faraday&Future Inc., Gardena, CA (US)

(72) Inventors: Anand Sunadham, Farmington Hills, MI (US); Kenneth X. Xie, Manhattan Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 106 days.

(21) Appl. No.: 15/338,208

(22) Filed: Oct. 28, 2016

(65) Prior Publication Data
US 2017/0124871 A1    May 4, 2017

Related U.S. Application Data

(60) Provisional application No. 62/249,090, filed on Oct. 30, 2015.

(51) Int. Cl.
*G08G 1/133* (2006.01)
*H04Q 9/00* (2006.01)
*G08G 1/01* (2006.01)

(52) U.S. Cl.
CPC ............. *H04Q 9/00* (2013.01); *G08G 1/0112* (2013.01)

(58) Field of Classification Search
CPC ............................... H04Q 9/00; G08G 1/0112
USPC .......................................................... 701/465
See application file for complete search history.

(56) References Cited

U.S. PATENT DOCUMENTS

| | | |
|---|---|---|
| 5,815,071 A | 9/1998 | Doyle |
| 6,694,235 B2 | 2/2004 | Akiyama |
| 7,113,127 B1 | 9/2006 | Banet et al. |
| 7,562,167 B2 | 7/2009 | Anderson |
| 7,623,949 B2 | 11/2009 | Nou |
| 8,452,486 B2 | 5/2013 | Banet et al. |

(Continued)

FOREIGN PATENT DOCUMENTS

| | | |
|---|---|---|
| CA | 2502113 C | 11/2010 |
| WO | WO-2007/117370 A1 | 10/2007 |

OTHER PUBLICATIONS

Oyler, Alex and Saiedian, Hossein; Security in automotive telematics: a survey of threats and risk mitigation strategies to counter the existing and emerging attack vectors; Sep. 7, 2016; Security and Communication Networks vol. 9, Issue 17; https://onlinelibrary.wiley.com/doi/full/10.1002/sec.1610.*

*Primary Examiner* — Brian P Sweeney
(74) *Attorney, Agent, or Firm* — Morrison & Foerster LLP

(57) ABSTRACT

A system within an environment of a vehicle in which one or more electronic control unit(s) (ECU) having its own communications protocol stack (e.g., a TCP/IP stack) can communicate with an ECU gateway that functions as a component of an infotainment system. Each ECU can thereby publish its own data in real time, through an Internet (or similar) connection in the infotainment system, to a broker that can store the data from all connected ECUs of a plurality of vehicles. A backend system can subscribe to certain published data feeds (e.g., all ECU-2 and ECU-3 data from every 2010 model vehicle, or all ECU-2 data from every vehicle) via the broker to pull a specific subset of available data for analysis and/or visualization. The present invention enables users of a backend system to query for (Continued)

data from vehicles that are not connected to the Internet in real time.

19 Claims, 6 Drawing Sheets

(56) References Cited

U.S. PATENT DOCUMENTS

2005/0256614 A1 11/2005 Habermas
2012/0295592 A1 11/2012 Peirce

* cited by examiner

SYSTEM AND METHOD FOR VEHICLE DATA COMMUNICATION

CROSS REFERENCE TO RELATED APPLICATION

This application claims the benefit of U.S. Provisional Patent Application No. 62/249,090, filed on Oct. 30, 2015, the entire disclosures of which are incorporated herein by reference for all intended purposes.

FIELD OF THE DISCLOSURE

This relates generally to a system and method for collecting data from electronic control units of a vehicle, such as an automobile.

BACKGROUND

Modern vehicles, especially automobiles, increasingly include connected features that allow the vehicle to communicate with other devices or vehicles, often over the Internet. For example, a smartphone can communicate with a vehicle and be used to lock and unlock the vehicle doors. However, because such vehicles are not always connected to an information infrastructure or network, it can be difficult at times to collect data from a plurality of vehicles using a backend system—such a collection query might result in the return of data from only those vehicles that were connected to a network at the time of the query.

SUMMARY OF THE INVENTION

It is therefore an object of the present invention to collect data from vehicles even when some of the vehicles are not connected to a network at the time of data query.

It is also an object of the present invention to facilitate data communication between vehicles, and between vehicles and a centralized network facility.

In examples of the disclosure, each electronic control unit (ECU) of a vehicle preferably includes its own communications protocol stack (e.g., a TCP/IP stack) that can communicate separately with an ECU gateway, which functions as a component of an infotainment system. Each ECU can thereby publish its own data in real time, through an Internet connection in the infotainment system, to a broker that can store the data from all connected ECUs in every vehicle in a fleet. Then, a backend system can subscribe to certain published data feeds (e.g., all ECU-2 and ECU-3 data from every 2010 model vehicle, or all ECU-2 data from every vehicle) via the broker to pull a specific subset of available data for analysis and/or visualization. This can allow users of a backend system to query for data from vehicles that are not currently on and connected to the internet.

Further, examples of the disclosure can allow users of a backend system to communicate data (e.g., messages, commands, configurations, updates, etc.) to various ECUs in various vehicles regardless of whether the vehicles or ECUs are currently on and connected to the Internet. Each of the broker and the infotainment system preferably include a shadow system that queues data for delivery to any vehicle and/or ECU that is not currently on and connected. Once the destination vehicle and ECU are connected the data can be delivered.

DETAILED DESCRIPTION

In the following description of embodiments, reference is made to the accompanying drawings which form a part hereof, and in which it is shown by way of illustration specific embodiments which can be practiced. It is to be understood that other embodiments can be used and structural changes can be made without departing from the scope of the disclosed embodiments.

Modern vehicles, especially automobiles, increasingly include connected features that allow the vehicle to communicate with other devices, often over the Internet. For example, a smartphone can communicate with a vehicle and be used to lock or unlock the vehicle doors. However, because such vehicles are not always connected to a communications network, it can be difficult to collect data from such vehicles in real time.

In examples of the disclosure, a system according to the present invention includes a vehicle equipped with electronic control unit (ECU) that can include its own communications protocol stack (e.g., a TCP/IP stack) that can communicate separately with an ECU gateway, which functions as a component of an infotainment system. Each ECU can function as a node in an internet-of-things (IOT) in the vehicle and publish its own data in real time, through an Internet (or other similar types of) connection in the infotainment system, to a broker that can store the data from all connected ECUs in every vehicle in a fleet. In one embodiment, the broker can be a remote server such as a cloud server or a web service. A backend system can subscribe to certain published data feeds (e.g., all ECU-2 and ECU-3 data from every 2010 model vehicle, or all ECU-2 data from every vehicle) via the broker to pull a specific subset of available data for analysis and/or visualization. This can allow users of a backend system to query for data from vehicles that are not currently on and connected to the Internet.

Further, examples of the disclosure can enable users of a backend system to communicate data (e.g., messages, commands, configurations, updates, etc.) to various ECUs in various vehicles regardless of whether the vehicles or ECUs are connected to a network. Both the broker and the infotainment system can include a shadow system that queues data for delivery to any vehicle and/or ECU that is not connected to a network. Once the destination vehicle and ECU are awake and connected, the data can be delivered.

Figure 1:
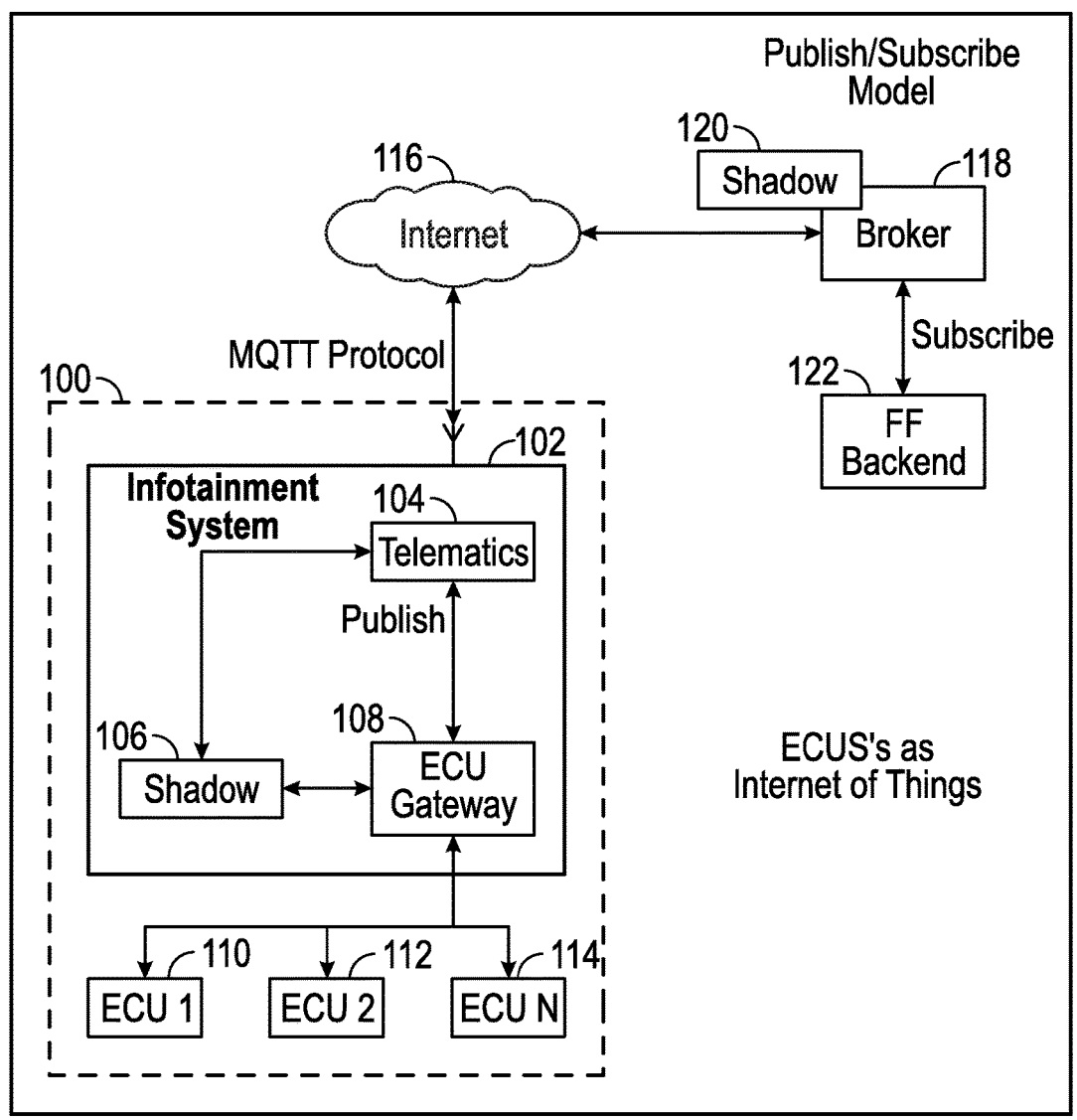
FIG. 1 illustrates an exemplary system for vehicle data communication according to embodiments of the disclosure.

FIG. 1 illustrates an exemplary system for vehicle data communication according to embodiments of the disclosure. A vehicle 100 can include a plurality of ECUs (e.g., ECU-1 110, ECU-2 112, and ECU-N 114) and an infotainment system 102 (e.g., a head unit for audio and/or visual information and entertainment). An ECU can be any embedded system that controls one or more of the electrical systems or subsystems in a vehicle such as an automobile. Examples of ECUs include an engine control module, a speed control unit, a powertrain control module, a transmission control module, a brake control module, and/or a door control unit, among numerous other possibilities. Each ECU can output data related to its operation. For example, a speed control unit could output a current speed, a door control unit could output a status indicating whether each door is opened, closed, locked, or unlocked, etc.

Each of the ECUs can include its own communications protocol stack (e.g., a TCP/IP stack) in communication with an ECU gateway 108 that functions as part of the infotainment system 102. The ECU gateway 108 can facilitate communication of data to and from each of the individual ECUs. The infotainment system 102 can further include a telematics module 104 in communication with the ECU gateway to transmit data between the ECU gateway and other remote devices across a network, such as the Internet 116. This vehicle data can be transmitted to/from a broker 118, which can provide some or all of the data to one or more backend systems such as backend system 122. In some examples, the broker 118 and the backend system 122 can both be included in a single electronic device, such as a server. For example, the broker and the backend system can be separate software modules on one server.

Both the infotainment system 102 and the broker 118 can include a shadow system (e.g., shadow system 106 in the infotainment system 102 and shadow system 120 in the broker 118) that queues data for later transmission, as described in greater detail below with respect to FIG. 3.

Figure 2:
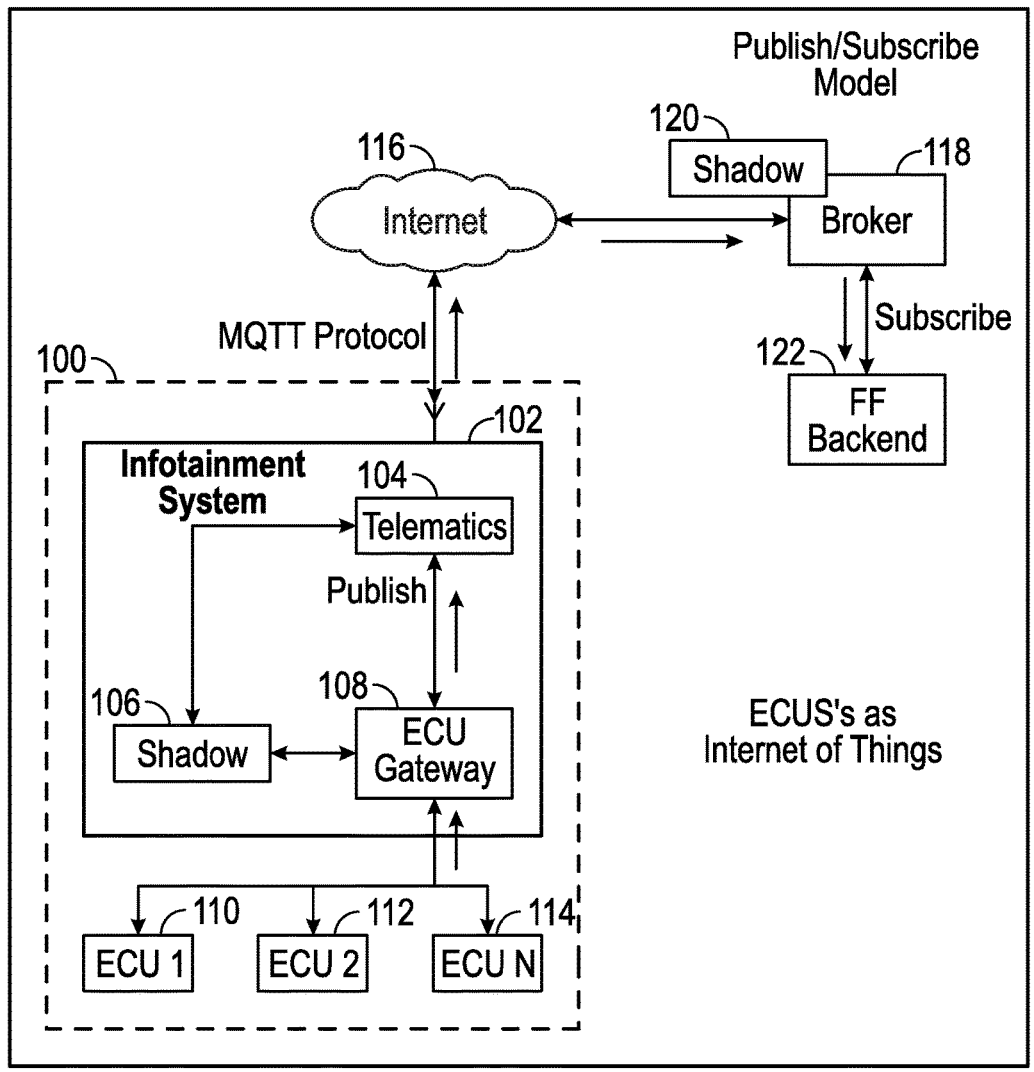
FIG. 2 illustrates an exemplary flow of vehicle data from one or more ECUs according to embodiments of the disclosure.

FIG. 2 illustrates an exemplary flow of vehicle data from one or more ECUs according to embodiments of the disclosure. As data is generated by each ECU 110, 112, and 114, each respective ECU can publish that data via its respective communications stack through the ECU gateway 108, transmitted by the telematics system 104 over the Internet 116 to the broker 118. This data can be published in real time as it is generated and/or at regular intervals depending on the type of data and the particular configuration. Further, the data can be transmitted using any number of communications protocols (e.g., a lightweight messaging protocol such as MQTT). The broker 118 can store the vehicle data in association with information about the particular vehicle and ECU from which it was generated.

One or more backend systems, such as backend system 122, can subscribe to one or more published data feeds. For example, the backend system 122 can subscribe to all ECU-2 and ECU-3 data from every 2010 model vehicle or all ECU-2 data from every vehicle. When new data is received by the broker 118, it can push the data to any backend system that is subscribed to that data. Further, the backend system 122 can make specific queries to pull data on demand from the broker 118. The backend system 122 can use the data for analysis or visualization in a graphical user interface. For example, vehicle speed data can be analyzed for insurance purposes, or location information can be analyzed to determine traffic patterns. Dashboard user interfaces can be displayed on the backend system 122 to visualize data from multiple feeds. In some examples, the data can trigger events, such as prompting a communication back to the vehicle(s). As an example, the data can be used to determine the relative distance, shortest routes between two vehicles. Similarly, based on the locations of the vehicles, the backend system 122 can propose a meeting point for the vehicles from a predetermined set of destinations and transmit the proposed meeting point to both vehicles. The backend system 122 can also inform each vehicle if the other vehicle has accepted the proposed meeting point and its estimated arrival time based on its current speed and/or traffic condition. If one of the vehicles rejects the proposed meeting point, the backend system 122 can select from the predetermined set of destinations a different meeting point and transmit it to the vehicles. Additionally or alternatively, if the two vehicles are within certain distance of each other, the backend system 122 can inform the vehicles through their infotainment system the location of the other vehicle and, optionally, prompt to establish a communication channel (e.g., voice or video call) between the two vehicles.

Figure 3:
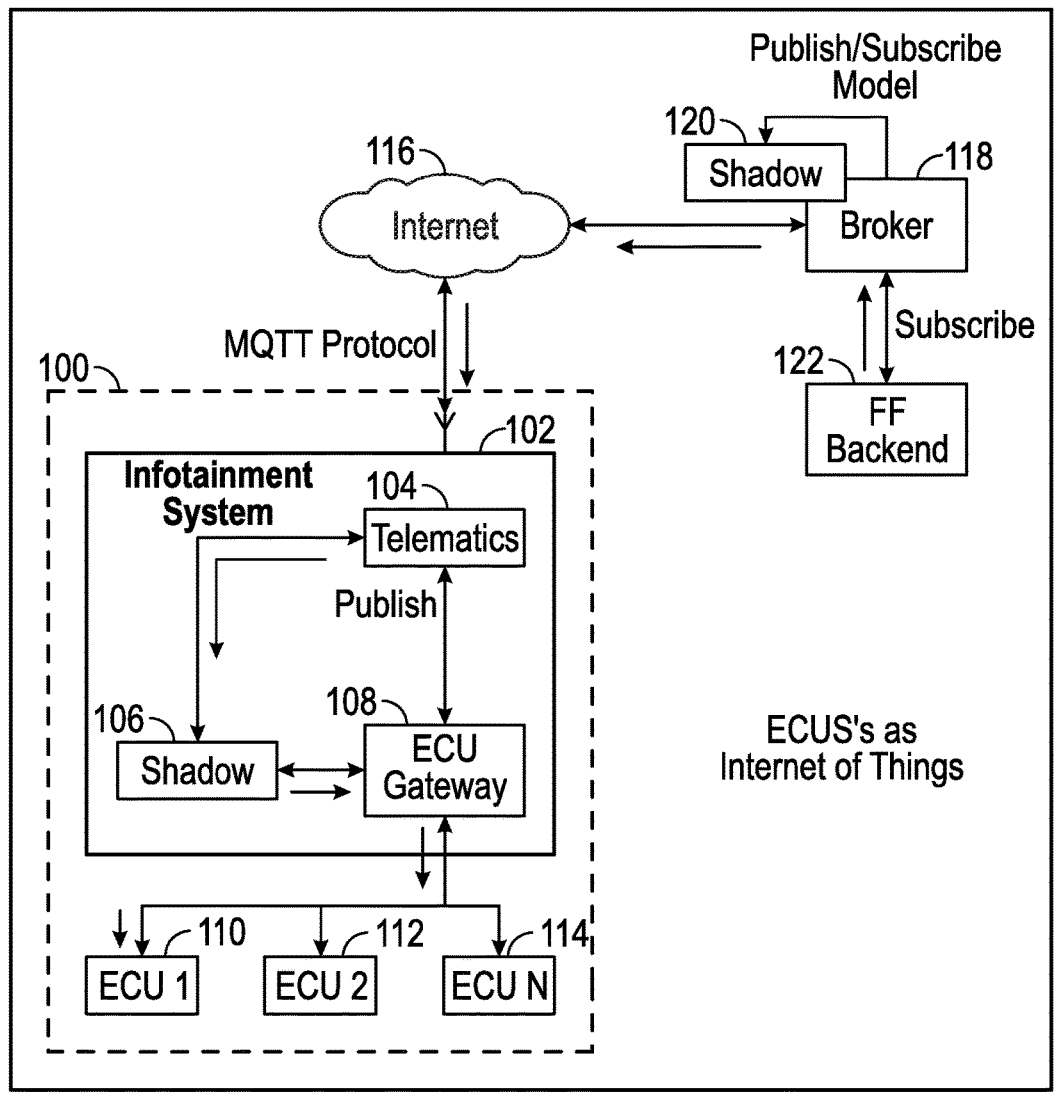
FIG. 3 illustrates an exemplary flow of vehicle data from a backend system according to embodiments of the disclosure.

FIG. 3 illustrates an exemplary flow of vehicle data from a backend system according to embodiments of the disclosure. A backend system 122 can send data back to one or more vehicles along the same pathways used to publish data to the broker 118. For example, the backend system 122 may push software updates or new configurations to various ECUs. Because the vehicle 100 and/or the target ECU may not be on and connected to the Internet when the data is sent, shadow systems 120 and 106 can be used to queue the data for later transmission. Each shadow system can store a list of data queued for later transmission.

For example, when the backend system 122 pushes a software update for ECU-1 in all vehicles, the software update can be transmitted to the broker 118. Upon receipt of the software update, the broker 118 can transmit the update to any target vehicles that are currently on and connected to the Internet. Further, the software update can be stored in the shadow system 120 for later transmission to vehicles that are not currently online. Once vehicle 100 is on and connected to the Internet, the shadow system 120 can transmit the software update to the vehicle 100.

The update can then be queued in the vehicle's shadow system 106 if the ECU-1 110 is not powered on. Various ECUs may not always be powered on when not in use, even when the vehicle is powered on. This can help with energy efficiency especially in electric battery-powered vehicles. Once ECU-1 110 is powered on, the shadow system 106 can push the software update through the ECU gateway 108 to ECU-1. In some embodiments, a shadow system can force an ECU to wake from a sleep mode (or other low power mode), in response to a high priority communication, for example, such as a security-related software update.

Figure 4A:
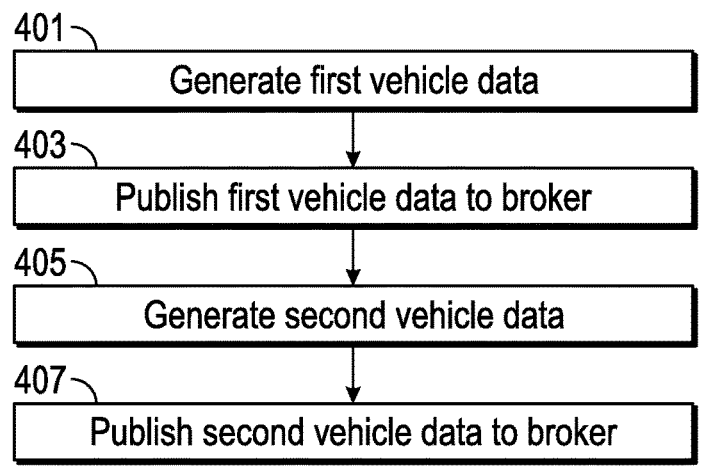
FIGS. 4A-4D illustrate exemplary methods of vehicle data communication according to embodiments of the disclosure.

FIG. 4A illustrates an exemplary method of communicating vehicle data from a vehicle (e.g., the vehicle 100) including a plurality of electronic control units in accordance with some embodiments. The vehicle 100 can generate (401) first vehicle data in a first electronic control unit of the plurality of electronic control units. In response to generating the first vehicle data, the vehicle 100 can publish (403) the first vehicle data through an electronic control unit gateway to a broker. The vehicle 100 can generate (405) second vehicle data in a second electronic control unit of the plurality of electronic control units. In response to generating the second vehicle data, the vehicle 100 can publish (407) the second vehicle data through the electronic control unit gateway to the broker.

Figure 4B:
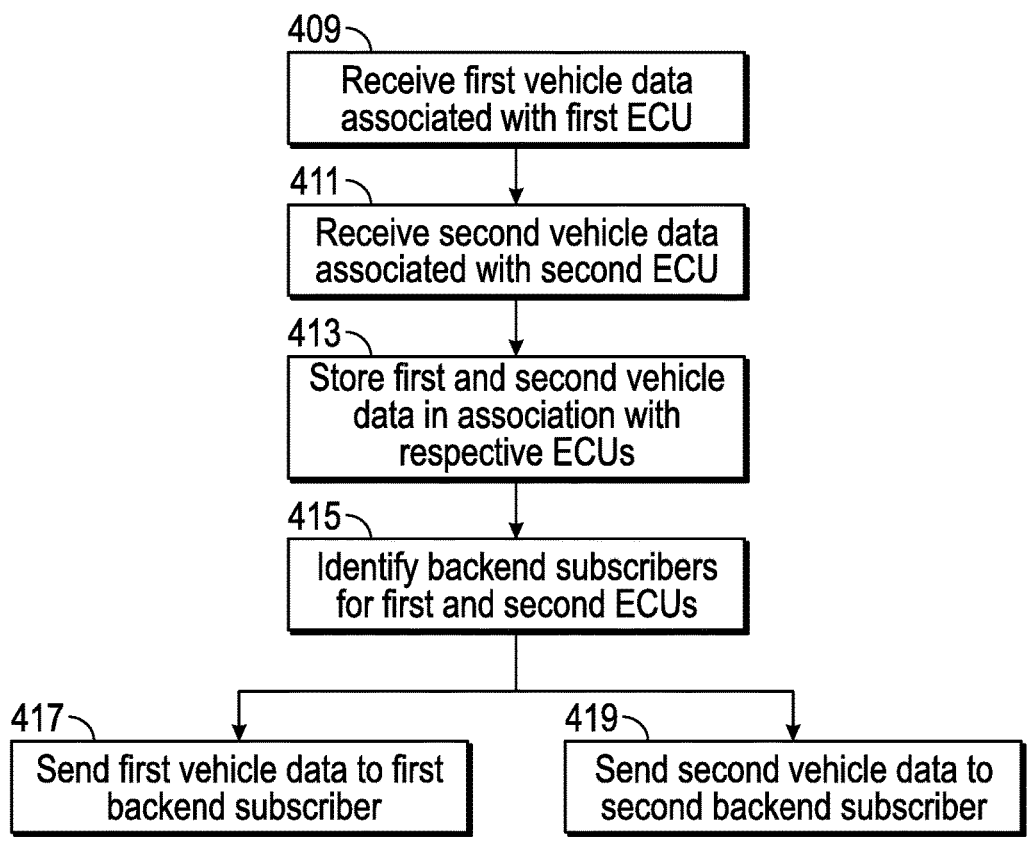

FIG. 4B illustrates an exemplary method of receiving vehicle data from a vehicle including a plurality of electronic control units (e.g., as communicated by a vehicle 100 according to the method described above with respect to FIG. 4A) in accordance with embodiments of the disclosure. A broker 118 can receive (409) first vehicle data associated with a first electronic control unit of the plurality of electronic control units. The broker 118 can receive (411) second vehicle data associated with a second electronic control unit of the plurality of electronic control units. The broker 118 can store (413) the first vehicle data in association with information of the first electronic control unit, and store the second vehicle data in association with information of the second electronic control unit.

In some examples, the broker 118 can identify (415) a first backend subscriber to data associated with the first electronic control unit, and a second backend subscriber to data associated with the second electronic control unit. In response to receiving the first vehicle data, the broker 118 can send (417) the first vehicle data to the first backend subscriber. In response to receiving the second vehicle data, the broker 118 can send (419) the second vehicle data to the second backend subscriber.

Figure 4C:
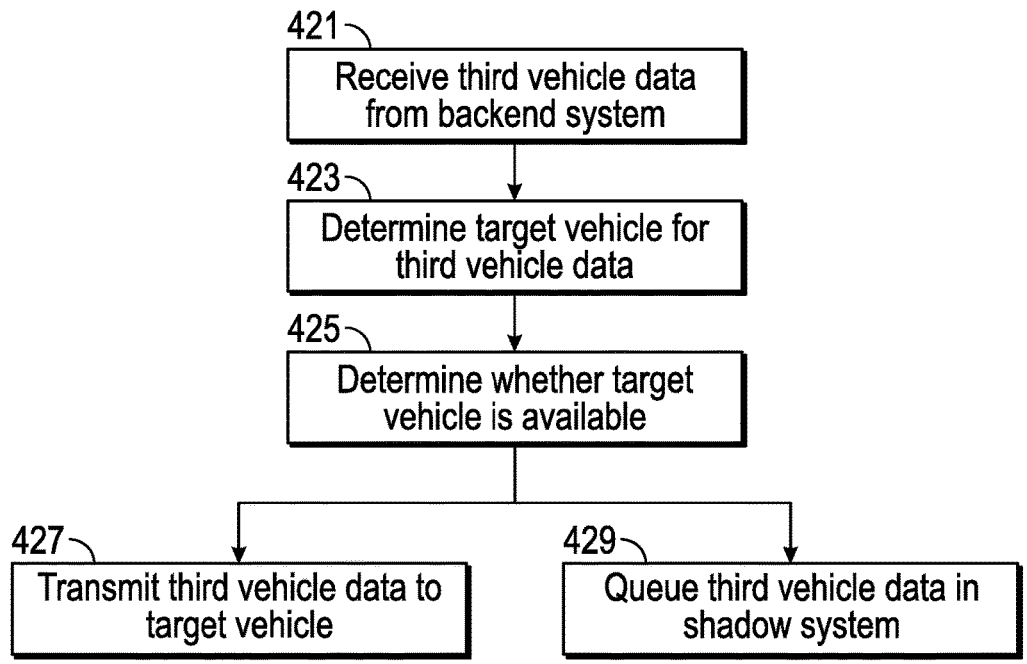

FIG. 4C illustrates an exemplary method of shadowing vehicle data before sending to a vehicle in accordance with embodiments of the disclosure. A broker 118 can receive (421) third vehicle data from a backend system. The broker 118 can determine (423) a target vehicle for the third vehicle data. The broker 118 can determine (425) whether the target vehicle is available (e.g., powered on, awake, and/or connected to the Internet). In accordance with a determination that the target vehicle is available, the broker 118 can transmit (427) the third vehicle data to the target vehicle. In accordance with a determination that the target vehicle is not available, the broker 118 can queue (429) the third vehicle data in a shadow system until the target vehicle is available.

Figure 4D:
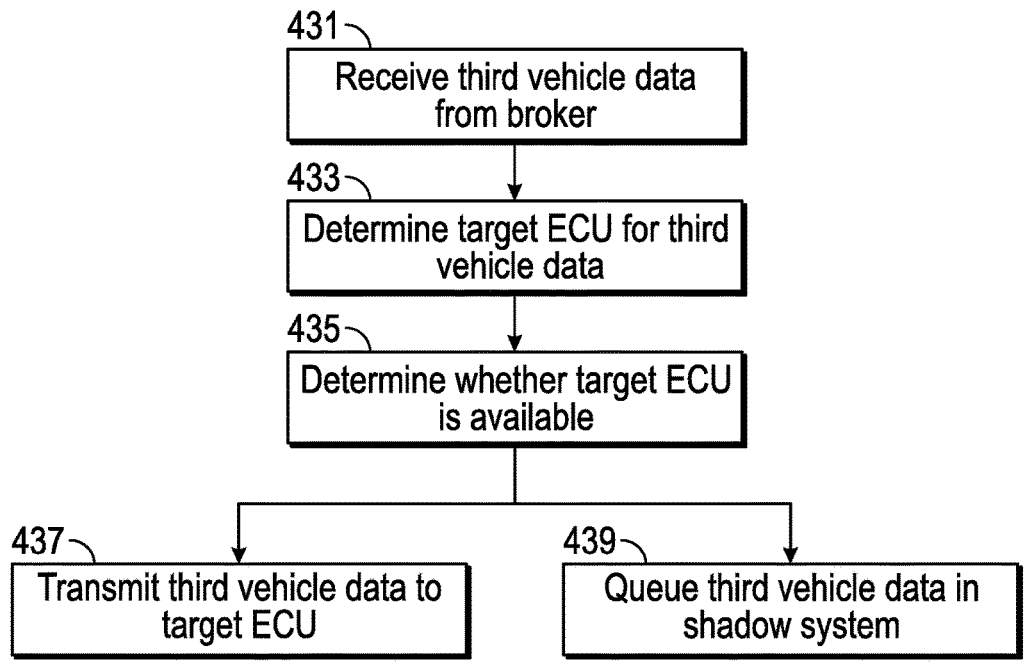

FIG. 4D illustrates an exemplary method of shadowing vehicle data before sending to an ECU (e.g., vehicle data received from a broker as described above with respect to FIG. 4C) in accordance with embodiments of the disclosure. The vehicle 100 can receive (431) third vehicle data from a broker. The vehicle 100 can determine a target electronic control unit for the third vehicle data. The vehicle 100 can determine (435) whether the target electronic control unit is available (e.g., powered on, awake, and/or connected to the ECU gateway). In accordance with a determination that the target electronic control unit is available, the vehicle 100 can transmit (437), via the electronic control unit gateway, the third vehicle data to the target electronic control unit. In accordance with a determination that the target electronic control unit is not available, the vehicle 100 can queue (439) the third vehicle data in a shadow system until the target electronic control unit is available.

Figure 5:
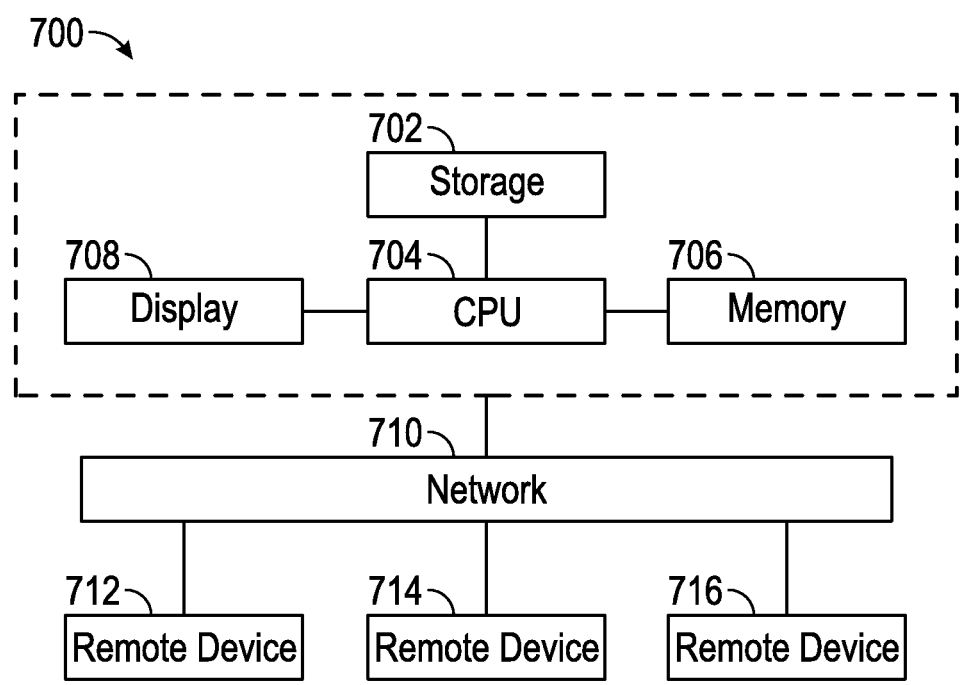
FIG. 5 illustrates an exemplary system for vehicle data communication according to embodiments of the disclosure.

FIG. 5 illustrates an exemplary system 700 for vehicle data communication according to embodiments of the disclosure. The system 700 can include a CPU 704, storage 702, memory 706, and display 708. The CPU 704 can perform the methods illustrated in and described with reference to FIGS. 1-4. Additionally, the storage 702 can store data and instructions for performing the methods illustrated and described with reference to FIGS. 1-4. The storage can be any non-transitory computer readable storage medium, such as a solid-state drive or a hard disk drive, among other possibilities. User interfaces, such as analysis and visualizations of the vehicle data described above, may be displayed on the display 708.

The system 700 can communicate with one or more remote devices 712, 714, and 716 over a wired or wireless network 710, such as a local area network, wide-area network, or Internet, among other possibilities. The steps of the methods disclosed herein may be performed on a single system 700 or on several systems including the remote devices 712, 714, and 716.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method of communicating vehicle data from a vehicle including a plurality of electronic control units, the method comprising:
   generating first vehicle data in a first electronic control unit of the plurality of electronic control units;
   publishing the first vehicle data through an electronic control unit gateway of the vehicle and a telematics system of the vehicle to a broker;
   generating second vehicle data in a second electronic control unit of the plurality of electronic control units;
   publishing the second vehicle data through the electronic control unit gateway of the vehicle and a telematics system of the vehicle to the broker.

2. The method of claim 1, the method further comprising:
   receiving, at the telematics system of the vehicle, third vehicle data from the broker;
   determining, at the telematics system of the vehicle, whether a target electronic control unit for the third vehicle data is available;
   in accordance with a determination that the target electronic control unit is available, transmitting, via the electronic control unit gateway of the vehicle and the telematics system of the vehicle, the third vehicle data to the target electronic control unit; and
   in accordance with a determination that the target electronic control unit is not available, queueing the third vehicle data in a shadow system until the target electronic control unit is available.

3. The method of claim 1, the method further comprising:
   identifying, with the broker, a first backend subscriber to data associated with the first electronic control unit, and a second backend subscriber to data associated with the second electronic control unit;
   in response to receiving the first vehicle data, sending, with the broker, the first vehicle data to the first backend subscriber; and
   in response to receiving the second vehicle data, sending, with the broker, the second vehicle data to the second backend subscriber.

4. The method of claim 1, the method further comprising:
   receiving, at the broker, third vehicle data from a backend system;
   determining, at the broker, whether a target vehicle for the third vehicle data is available;
   in accordance with a determination that the target vehicle is available, transmitting, with the broker, the third vehicle data to the target vehicle via a telematics system of the target vehicle and an electronic control unit gateway of the target vehicle; and
   in accordance with a determination that the target vehicle is not available, queueing, with the broker, the third vehicle data in a shadow system until the target vehicle is available.

5. The method of claim 1, the method further comprising:
   receiving, from the broker, third vehicle data associated with a third electronic control unit of a second plurality of electronic control units from a second vehicle different from the vehicle at a backend system operatively coupled to the broker;
   receiving, from the broker, fourth vehicle data associated with a fourth electronic control unit of the second plurality of electronic control units at the backend system; wherein:

the first vehicle data includes a first location data,
the second vehicle data includes a first speed data,
the third vehicle data includes a second location data,
the fourth vehicle data includes a second speed data, and
the method further comprises:
determining, at the backend system, a first destination based on the first location data and the second location data;
calculating, at the backend system, a first estimated arrival time of the vehicle based on the first location data, the first speed data, and the first destination;
calculating, at the backend system, a second estimated arrival time of the second vehicle based on the second location data, the second speed data, and the first destination;
transmitting, with the broker, the first estimated arrival time and first destination to the second vehicle; and
transmitting, with the broker, the second estimated arrival time and first destination to the vehicle.

6. The method of claim 5, the method further comprising:
receiving, at the backend system, a rejection of the first destination from the first vehicle or the second vehicle; and
in response to receiving the rejection of the first destination:
  selecting, at the backend system, a second destination from a predetermined set of destinations,
  transmitting, with the broker, the second destination to the second vehicle, and
  transmitting, with the broker, the second destination to the first vehicle.

7. A vehicle comprising:
a plurality of electronic control units, each including a communications stack;
an electronic control unit gateway in communication with a respective communications stack of each of the electronic control units; and
a telematics system connected to a network and in communication with the electronic control unit gateway, wherein the telematics system is configured to publish vehicle data from the plurality of electronic control units via the network.

8. The vehicle of claim 7, wherein:
a first electronic control unit of the plurality of electronic control units generates first vehicle data;
in response to generating the first vehicle data, the first electronic control unit publishes the first vehicle data through the electronic control unit gateway to a broker;
a second electronic control unit of the plurality of electronic control units generates second vehicle data; and
in response to generating the second vehicle data, the second electronic control unit publishes the second vehicle data through the electronic control unit gateway to the broker.

9. The vehicle of claim 7, wherein the vehicle further includes a shadow system, and wherein:
the telematics system receives third vehicle data from a broker;
the telematics system determines whether a target electronic control unit for the third vehicle data is available;
in accordance with a determination that the target electronic control unit is available, the electronic control unit gateway transmits the third vehicle data to the target electronic control unit; and
in accordance with a determination that the target electronic control unit is not available, the shadow system queues the third vehicle data until the target electronic control unit is available.

10. The vehicle of claim 7, wherein:
the telematics system of the vehicle is operably coupled to a broker,
the broker identifies a first backend subscriber to data associated with the first electronic control unit, and a second backend subscriber to data associated with the second electronic control unit,
in response to receiving the first vehicle data, the broker sends the first vehicle data to the first backend subscriber, and
in response to receiving the second vehicle data, the broker sends the second vehicle data to the second backend subscriber.

11. The vehicle of claim 7, wherein:
the telematics system of the vehicle is operably coupled to a broker,
the broker receives third vehicle data from a backend system,
the broker determines whether a target vehicle for the third vehicle data is available,
in accordance with a determination that the target vehicle is available, the broker transmits the third vehicle data to the target vehicle via a telematics system of the target vehicle and an electronic control unit gateway of the target vehicle, and
in accordance with a determination that the target vehicle is not available, queueing, with the broker, the third vehicle data in a shadow system until the target vehicle is available.

12. The vehicle of claim 7, wherein:
the telematics system of the vehicle is operably coupled to a broker,
the telematics system of the vehicle receives, from the broker, third vehicle data associated with a third electronic control unit of a second plurality of electronic control units from a second vehicle different from the vehicle at a backend system operatively coupled to the broker,
the telematics system of the vehicle receives, from the broker, fourth vehicle data associated with a fourth electronic control unit of the second plurality of electronic control units at the backend system,
the first vehicle data includes a first location data,
the second vehicle data includes a first speed data,
the third vehicle data includes a second location data,
the fourth vehicle data includes a second speed data,
the backend system determines a first destination based on the first location data and the second location data;
the backend system calculates a first estimated arrival time of the vehicle based on the first location data, the first speed data, and the first destination;
the backend system calculates a second estimated arrival time of the second vehicle based on the second location data, the second speed data, and the first destination;
the broker transmits the first estimated arrival time and first destination to the second vehicle; and
the broker transmits the second estimated arrival time and first destination to the vehicle.

13. The vehicle of claim 12, wherein:
the backend system receives a rejection of the first destination from the first vehicle or the second vehicle; and
in response to receiving the rejection of the first destination:

the backend system selects a second destination from a predetermined set of destinations, the broker transmits the second destination to the second vehicle, and the broker transmits the second destination to the first vehicle.

14. A non-transitory computer-readable storage medium storing instructions that, when executed by one or more processors incorporated into a vehicle, causes the one or more processors to perform a method of communicating vehicle data with the vehicle, the method comprising:

generating first vehicle data in a first electronic control unit of a plurality of electronic control units of the vehicle;

publishing the first vehicle data through an electronic control unit gateway of the vehicle and a telematics system of the vehicle to a broker;

generating second vehicle data in a second electronic control unit of the plurality of electronic control units of the vehicle; and publishing the second vehicle data through the electronic control unit gateway of the vehicle and the telematics system of the vehicle to the broker.

15. The non-transitory computer-readable storage medium of claim 14, the method further comprising:

receiving, at the telematics system of the vehicle, third vehicle data from the broker;

determining, at the telematics system of the vehicle, whether a target electronic control unit for the third vehicle data is available;

in accordance with a determination that the target electronic control unit is available, transmitting, via the electronic control unit gateway of the vehicle and the telematics system of the vehicle, the third vehicle data to the target electronic control unit; and in accordance with a determination that the target electronic control unit is not available, queueing the third vehicle data in a shadow system until the target electronic control unit is available.

16. The non-transitory computer-readable storage medium of claim 14, the method further comprising:

identifying, with the broker, a first backend subscriber to data associated with the first electronic control unit, and a second backend subscriber to data associated with the second electronic control unit;

in response to receiving the first vehicle data, sending, with the broker, the first vehicle data to the first backend subscriber; and in response to receiving the second vehicle data, sending, with the broker, the second vehicle data to the second backend subscriber.

17. The non-transitory computer-readable storage medium of claim 14, the method further comprising:

receiving, at the broker, third vehicle data from a backend system;

determining, at the broker, whether a target vehicle for the third vehicle data is available;

in accordance with a determination that the target vehicle is available, transmitting, with the broker, the third vehicle data to the target vehicle via a telematics system of the target vehicle and an electronic control unit gateway of the target vehicle; and in accordance with a determination that the target vehicle is not available, queueing, with the broker, the third vehicle data in a shadow system until the target vehicle is available.

18. The non-transitory computer-readable storage medium of claim 14, the method further comprising:

receiving, from the broker, third vehicle data associated with a third electronic control unit of a second plurality of electronic control units from a second vehicle different from the vehicle at a backend system operatively coupled to the broker;

receiving, from the broker, fourth vehicle data associated with a fourth electronic control unit of the second plurality of electronic control units at the backend system; wherein:

the first vehicle data includes a first location data,
the second vehicle data includes a first speed data,
the third vehicle data includes a second location data,
the fourth vehicle data includes a second speed data, and the method further comprises:

determining, at the backend system, a first destination based on the first location data and the second location data;

calculating, at the backend system, a first estimated arrival time of the vehicle based on the first location data, the first speed data, and the first destination;

calculating, at the backend system, a second estimated arrival time of the second vehicle based on the second location data, the second speed data, and the first destination;

transmitting, with the broker, the first estimated arrival time and first destination to the second vehicle; and transmitting, with the broker, the second estimated arrival time and first destination to the vehicle.

19. The non-transitory computer-readable storage medium of claim 18, the method further comprising:

receiving, at the backend system, a rejection of the first destination from the first vehicle or the second vehicle; and in response to receiving the rejection of the first destination:

selecting, at the backend system, a second destination from a predetermined set of destinations, transmitting, with the broker, the second destination to the second vehicle, and transmitting, with the broker, the second destination to the first vehicle.

* * * * *